United States Patent [19]
Takahashi et al.

[11] 3,876,853
[45] Apr. 8, 1975

[54] FLUX SUPPLY DEVICE FOR A SUBMERGED ARC WELDING

[75] Inventors: Nobuhiro Takahashi; Tatsuo Ide, both of Fukuyama, Japan

[73] Assignee: Nippon Kokan Kabushiki Kaisha, Tokyo, Japan

[22] Filed: Apr. 26, 1973

[21] Appl. No.: 354,762

[30] Foreign Application Priority Data
Jan. 23, 1973   Japan................................ 48-9764

[52] U.S. Cl. ...................... 219/73; 222/56; 302/22; 302/28; 302/42
[51] Int. Cl............................................ B23k 9/18
[58] Field of Search ............ 219/73; 302/22, 42, 28; 222/56

[56] References Cited
UNITED STATES PATENTS
3,694,037   9/1972   Feder............................. 302/42 X FOREIGN PATENTS OR APPLICATIONS
788,535   1/1958   Australia.............................. 219/73

Primary Examiner—J. V. Truhe
Assistant Examiner—N. D. Herkamp
Attorney, Agent, or Firm—Flynn & Frishauf

[57] ABSTRACT

A head of a welding machine is disposed within pipe to be welded according to a submerged arc welding method. The head houses a small flux supply hopper connected through a flux supply duct to an outside master hopper for supplying a flux to the small hopper. A supply of flux is controlled by a control valve controlled by a flux level detector mounted to the small hopper, so that the amount of flux accumulated within the small hopper is maintained at all times constant.

5 Claims, 2 Drawing Figures

FLUX SUPPLY DEVICE FOR A SUBMERGED ARC WELDING

BACKGROUND OF THE INVENTION

This invention relates to a flux supply device for submerged arc welding.

With a conventional submerged welding machine a largesized flux supply hopper is provided in a welding device successively movable along the welding location of a workpiece. The large-sized hopper can accomodate a sufficient amount of flux to effect welding over a predetermined range of the workpiece. For this reason, however, a large-sized hopper is unavoidably required. As a result, a welding device becomes large-sized as a whole. Where a workpiece, for example, a pipe is welded from within, the device is applicable only to a large-diametered pipe, and it is disadvantageously impossible to weld a small-diametered pipe from within due to the bulky construction of the hopper and consequently the welding device. Even if the hopper is large enough to accomodate a greater amount of flux, it is impossible to weld a very lengthy pipe. Furthermore, a smooth supply of flux into the hopper, as well as a rapid movement of the welding device along the welding location of the workpiece, can not be made due to the large-sized, weighty hopper, thus presenting an obstacle to enhancing the efficiency of the welding operation.

A primary object of this invention is to provide a flux supply device capable of welding a small-diametered pipe from within by providing compact a welding device movable within the pipe to be welded during the welding operation.

Another object of this invention is to provide a flux supply device capable of welding a very lengthy pipe by continuously supplying a flux from the outside into a smallsized flux supply hopper housed in a welding device.

A further object of this invention is to provide a flux supply device capable of enhancing the efficiency of a welding operation by making a welding device compact.

A still further object of this invention is to provide a flux supply device capable of maintaining at all times a given amount of flux within a small-sized hopper by detecting the amount of flux accumulated within the small-sized hopper housed in a welding device to thereby control a supply of flux.

SUMMARY OF THE INVENTION

According to a flux supply device for a submerged arc welding, a welding device houses a small-sized flux supply hopper connected through a duct to an outside supply source of large capacity. The flux is continuously fed from the outside flux supply source through the duct into the smallsized hopper. The amount of flux accumulated within the small-sized hopper is detected by a flux level detector provided on the small-sized hopper. The flux level detector is operatively associated with a flux supply adjusting device provided in a nozzle portion of the outside flux supply source to control a supply of flux, thereby maintaining at all times constant the amount of flux accumulated within the small-sized hopper.

Further provided is a baffle plate located within the small hopper in a position corresponding to the height of the flux level detector and cooperative with the duct for preventing the flux entrained air blown from the duct into the small hopper from being directly directed to the flux level detector. The baffle plate further serves to decelerate the flux entrained air blown from the duct and to cause the flux to be separated from the air, the flux thereby being more effectively accumulated within the small hopper.

DESCRIPTION OF THE PREFERRED EMBODIMENT

Figure 1:
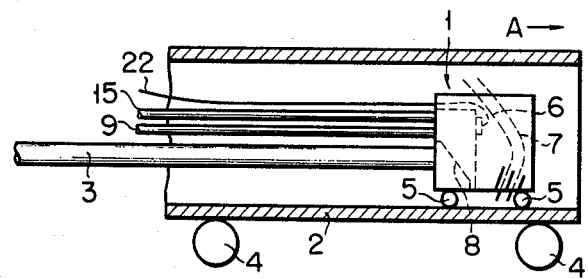
FIG. 1 is a front view showing a head portion of a submerged arc welding machine provided with a flux supply device (partly shown) according to this invention as used in welding a pipe from within.

In FIG. 1 a head 1 corresponding to the body portion of a submerged arc welding machine is disposed within a pipe 2 which is a base material to be welded. The head 1 is secured to one end of a supporting boom 3 extending in an axial direction of the pipe 2, and the other end of the supporting boom 3 is fixed to a stationary frame (not shown) of the welding machine. The pipe 2 can be moved, in a direction shown by an arrow A, relative to the stationary head 1.

The movement of the pipe 2 is effected through rotation of rollers 4. Wheels 5 are mounted at the bottom of the head 1 to permit the pipe 2 to be moved relative to the stationary head 1. With the movement of the pipe 2 relative to the head 1, welding is effected along a weld line (not shown) of the pipe 2 to be welded. The wheels 5 are not necessarily required, since the head 1 may be supported by a manipulator.

Bare core wires 6, 7 (or bare metal electrodes) as diagrammatically shown in FIG. 1 are passed through the head of the welding machine. In a submerged arc welding, the core wires 6,7 wound around a wire reel (not shown) are continuously fed through a core wire supply device (not shown) to a welding location The core wires 6,7 are made molten by a heat due to arcing developed between the pipe 6 and the core wire. Before the head 1 is moved together with the core wires 6,7, a flux is applied, through a flux supply hopper 8, along the weld line of the pipe 2 to be welded. The hopper 8 housed within the head 1 of the welding machine is made very compact as compared with a conventional hopper. The amount of flux receivable within the hopper 8 is not sufficient for a lenghty pipe to be welded completely. The hopper 8 is connected through a flux supply duct 9 to a large-sized master hopper 10 provided at the body portion of a flux supply device, so as to receive the flux from the master hopper 10.

Figure 2:
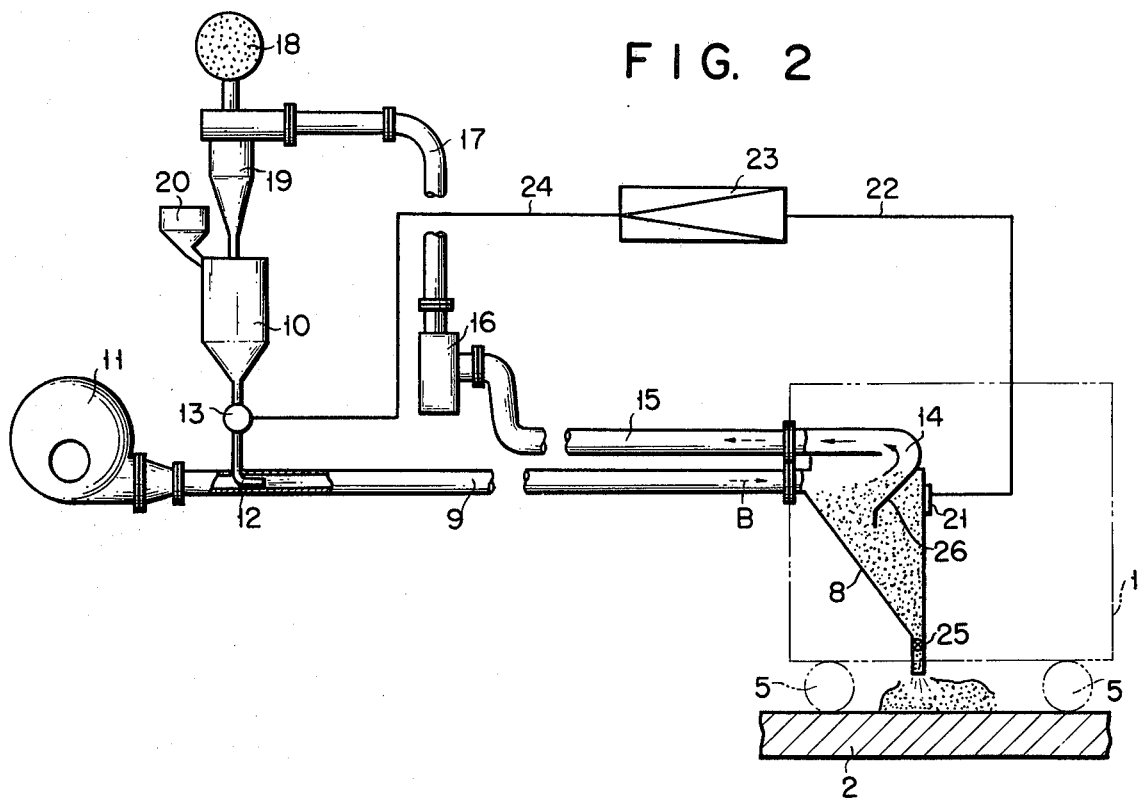
FIG. 2 is a diagrammatic view showing on different scales each part of the flux supply device according to this invention.

Referring to FIG. 2 the flux supply device is generally shown. In FIG. 2 the body portion of the flux supply device is shown on the right hand side and is far greater in size than the small flux supply hopper 8. The master hopper 10 is several times greater in dimension than the small hopper 8. However, the master hopper 10 is shown, by way of convenience, as smaller than the smaller hopper 8, since a different scale is used to show each part of the flux supply device One end of the flux supply duct 9 is connected to the upper portion of the small hopper 8 and a fan 11 is connected to the other end of the duct 9. In the neighborhood of the other end of the duct 9 a nozzle 12 is connected to the bottom of the master hopper 10 and extends downwardly into the pipe 2 in a manner that its mouth is open in an axial direction of the duct 9. The flux within the master hopper 10 is fed through the nozzle 12 into the duct 9 and then, as shown by an arrow B, under the influence of the fan 11 into the small hopper 8, together with air, where it is accumulated.

At the intermediate portion of the nozzle 12 is provided an adjusting device 13 for adjusting a supply of flux. A supply of flux into the small hopper 8 is suitably adjusted by controlling the adjusting device 13 as will be later described.

At the upper end of the small hopper 8 is provided an air outlet 14 connected to one end of an exhaust duct 15. The other end of the duct 15 is connected to a suction blower 16. One end of a connecting duct 17 is connected to the suction blower 16. A bag filter 18 and cyclone type flux collector 19 are connected to the other end of the connecting duct 17. The flux collector 19 is coupled to the top end of the master hopper 10. Flux entrained air flowed from the small hopper 8 through the air outlet 14 is sent to the flux collector 19 where it is separated into an air and a flux fraction. The separated flux fraction is dropped into the master hopper 10 while the separated air is flowed through the bag filter 18 to the outside. During the passage of the air through the bag filter 18 a remainging flux fraction is caught. In this way, the entrained flux is effectively collected into the master hopper 10.

Mounted at the upper end portion of the master hopper 10 is a flux supply box 20 for a fresh supply of flux into the master hopper 10.

The adjusting device 13 for adjusting a supply of flux is, for example, a control valve operated by an electric servo-motor (not shown) and is automatically controlled, as will be later described, in association with the amount of flux accumulated within the small hopper 8. A flux level detector 21 is provided at the upper side surface of the small hopper 8. The detector 21 is adapted to electrically detect the amount of flux accumulated within the small hopper 8 and may be of a conventional type. Therefore, a further explanation is omitted.

An electrical detection signal representative of the amount of flux accumulated within the small hopper 8 is supplied from the detector 21 through an electrical line 22 to an electric servo-amplifier 23 where it is amplified. The amplified detection signal is then supplied through an electrical line 24 to an electric servo-motor (not shown) of the control valve 13 to cause the servomotor to be driven to permit the control valve 13 to be operated. The control valve 13, upon receipt of the detection signal of the level detector 21, controls a supply of flux into the small hopper 8 so as to make at all times constant the amount of flux accumulated within the small hopper 8. During the welding operation, an increased application of flux from the lower open end of the small hopper 8 results in a correspondingly increased supply of flux from the master hopper 10 to the small hopper 8.

Since the control valve 13 is so operated there is no fear that the flux within the small hopper 8 is caused to be emptied during the welding operation. If a supply of flux is interrupted during the welding operation to cause the flux within the small hopper 8 to be emptied, no normal welding operation can be effected due to an oxidation etc. occuring at the welding portion. This situation should be absolutely avoided. According to this invention, however, there is no such fear.

Short of a flux application mouth situated at the lower end portion of the small hopper 8 is mounted a manually operable flux flow adjusting valve 25. The amount of flux applied can be adjusted, before the welding operation, according to a welding speed, a thickness of the pipe to be welded and so on by manually operating the value 25. Within the small hopper 8 a baffle plate 26 is located in a position corresponding the level indicator 21. The baffle plate 26 serves to reduce the flow velocity of a flux entrained air blown into the small hopper 8 to permit the flux only to be dropped down into the small hopper 8. The baffle plate 26 also serves to prevent the air stream blown into the small hopper 8 from being directed directly onto the flux level detector 21.

According to this invention a hopper 8 within the head 1 of the welding machine, and consequently the head 1 as a whole, can be made very compact. This compact design is suitable to welding a small-diametered pipe. Particularly either where a vibratory welding mechanism is incorporated into the head of the welding machine, or where a welding rod electrode has a multi-electrode for example, a two-electrode, three-electrode etc. device, a large-sized head will of necessity result. Even in these cases, according to this invention, the compact design of the small hopper permits the other parts to be incorporated with some latitude within the head of the welding machine. Therefore, the small hopper is indispensable for the attainment of this invention.

If, in the absence of the small hopper 8, flux is supplied from the master hopper 10 through the flux supply duct 9 directly to the welding location, a constant amount of flux cannot be applied to the welding location due to a deviation in the amount of flux flowed and a non-uniform speed of a flux entrained air stream blown under the influence of the fan 11. As a result, a desired stable welding operation can not be achieved. Therefore, the small hopper 8 is indispensable to apply a constant amount of flux in a stable way to the welding location.

According to this invention, flux can be continuously fed from the master hopper 10 through the duct 9 into the small hopper 8 under the influence of the fan 11. This arrangement requires no cumbersome operation of making an exchange between a large hopper and a small hopper according to a wider or narrower welding scope.

Flux can be intermittently sent out from the master hopper 10 using, as the flux level indicator 21, a level switch for low pressure and, as the flux supply adjusting device 13, a solenoid valve.

With the illustrated embodiment, the pipe to be welded is moved relative to the stationary head 1 of the welding machine. However, the head 1 may be movable relative to a fixed pipe to be welded.

What is claimed is;

1. A flux supply device for submerged arc welding comprising:
    a duct;
    a fan connected to one end of the duct so as to supply, together with air, a flux in a direction of the other end of the duct;
    a master hopper;

a nozzle connected to the master hopper and extending downwardly into the duct in the neighborhood of said one end of the duct so as to supply the flux from the master hopper into the duct;

a flux supply adjusting means mounted in the nozzle so as to control a supply of flux passing through the nozzle;

a small hopper connected to the other end of the duct, and incorporated into a welding machine head which is movable relative to a workpiece to be welded, said small hopper being adapted to accumulate the flux blown thereinto and to apply the flux in a predetermined amount onto the workpiece to be welded, said small hopper having at its upper end portion an air outlet for exhausting the air directed into the small hopper;

a flux level detector mounted to said small hopper for detecting the amount of flux accumulated within said small hopper;

a connecting means for operatively coupling said flux level detector with the flux supply adjusting means to control a supply of flux, through adjustment of the flux supply adjusting means, in response to the result of a detection made by the detector, so that a supply of flux into the small hopper is always maintained substantially constant; and means including a baffle plate located within the small hopper in a position corresponding to the height of said flux level detector and cooperative with said duct for preventing the flux entrained air blown from said duct into the small hopper from being directly directed to said flux level detector, said baffle plate further serving to decelerate the flux entrained air blown from said duct and to cause the flux to be separated from the air to permit the flux to be effectively accumulated within the small hopper.

2. The flux supply device according to claim 1 in which said connecting means includes an electrical servo-amplifier.

3. The flux supply device according to claim 1 in which a collecting means is further provided for collecting into the master hopper the flux entrained in the air which is exhausted from the outlet of said small hopper.

4. The flux supply device according to claim 1 in which said collecting means includes a cyclone type flux collector connected to the upper end of said master hopper.

5. The flux supply device according to claim 1 in which said baffle plate extends substantially downward toward the flux outlet end of said small hopper, and is interposed between said flux level detector and the connection of said small hopper with said other end of said duct.

* * * * *

UNITED STATES PATENT OFFICE
CERTIFICATE OF CORRECTION

Patent No. 3,876,853            Dated April 8, 1975

Inventor(s) Nobuhiro TAKAHASHI and Tatsuo IDE

It is certified that error appears in the above-identified patent and that said Letters Patent are hereby corrected as shown below:

Column 6, line 18, change "1" to --3--.

Signed and Sealed this eighteenth Day of November 1975

[SEAL]

Attest:

RUTH C. MASON  
Attesting Officer

C. MARSHALL DANN  
Commissioner of Patents and Trademarks